Aug. 29, 1950

O. PIETSCH 2,520,286

TWINE CUTTING MACHINE

Filed March 5, 1948

INVENTOR
Otto Pietsch
BY Edward N. Featherstonhaugh
ATTORNEY

Aug. 29, 1950 O. PIETSCH 2,520,286
TWINE CUTTING MACHINE
Filed March 5, 1948 3 Sheets-Sheet 2

INVENTOR
Otto Pietsch
BY Edward N. Fetherstonhaugh
ATTORNEY

Aug. 29, 1950  O. PIETSCH  2,520,286
TWINE CUTTING MACHINE
Filed March 5, 1948  3 Sheets-Sheet 3
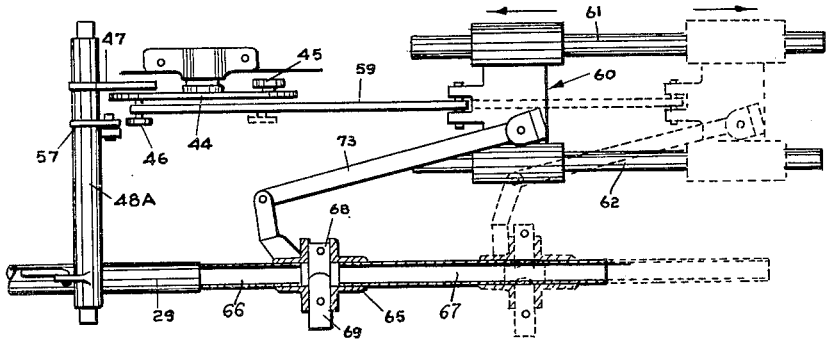
*Fig-6*
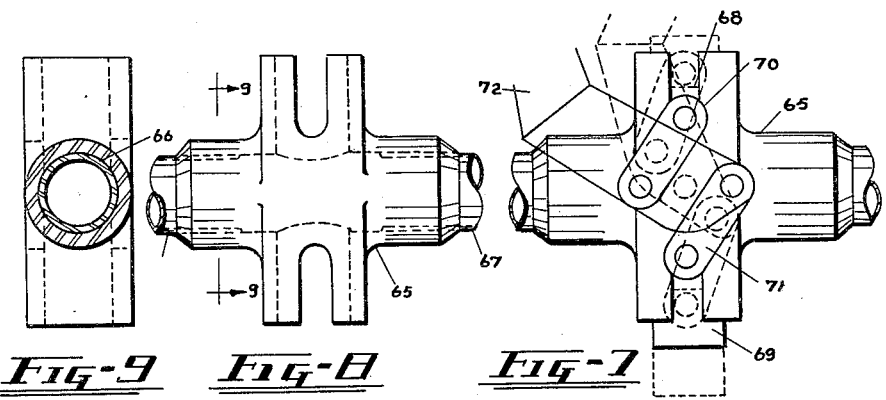
*Fig-9*  *Fig-8*  *Fig-7*
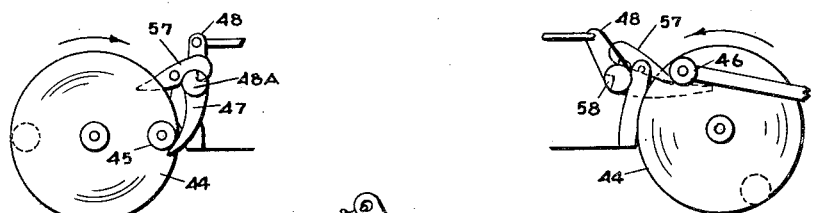
*Fig-10*  *Fig-11*
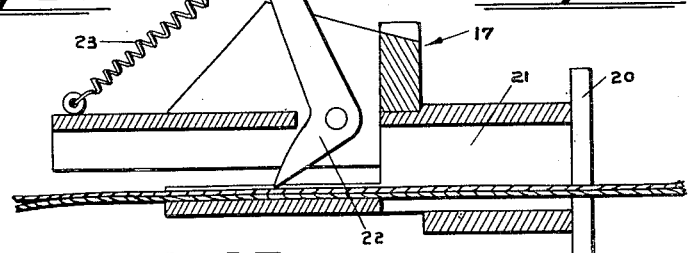
*Fig-12*
INVENTOR
Otto Pietsch
BY Edward N. Featherstonhaugh
ATTORNEY Patented Aug. 29, 1950

2,520,286

UNITED STATES PATENT OFFICE 2,520,286

TWINE CUTTING MACHINE

Otto Pietsch, Dryden, Ontario, Canada, assignor to Dryden Paper Company Limited, Dryden, Ontario, Canada Application March 5, 1948, Serial No. 13,172

2 Claims. (Cl. 164—68)

The invention relates to improvements in a twine cutting machine, as described in the present specification and illustrated in the accompanying drawings that form a part of the same.

The invention consists essentially of the novel features of construction as pointed out broadly and specifically in the claims for novelty following a description containing an explanation in detail of an acceptable form of the invention.

The objects of the invention are to devise a machine adapted to cut twine and the like into equal lengths; to furnish a cutting machine which will gauge the length of each piece of twine cut by the same; to facilitate removing windings of twine or the like from holders or spools and cutting same into equal lengths; to speed up the manufacture of articles in which cord or twine is used; to construct a machine suitably adapted to cut lengths of twine, such as twisted cord made from crepe paper, ordinary string or cord and the like; to contrive an automatic cutting machine for twine which will minimize labor costs in the manufacture of articles made from cord or twine; to make a twine cutting machine which will be simple in construction and inexpensive to manufacture; and, generally, to provide a twine cutting machine which will be dependable and efficient in its use.

In the drawings:

Figure 6 is a plan view of the twine feeder and its operating mechanism.

Figure 7 is an enlarged detail of the twine feeder in motion.

Figure 8 is an enlarged detail of the twine feeder housing.

Figure 9 is an end sectional view as taken on the line 9—9 in Figure 8.

Figure 10 is an enlarged rear view showing the tripper in position for holding the twine holder open.

Figure 11 is a front view of the tripper similar to Figure 10, with the exception that the same is in position for releasing the twine holder.

Figure 12 is an enlarged sectional detail of the leader as taken on the line 12—12 in Figure 1.

Like numerals of reference indicate corresponding parts in the various figures.

Figure 1:
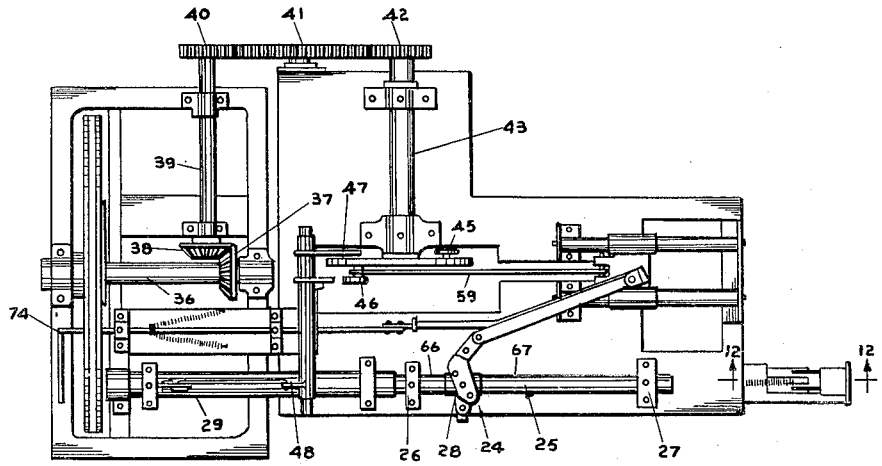
Figure 1 is a plan view of the twine cutting machine.
Figure 2:
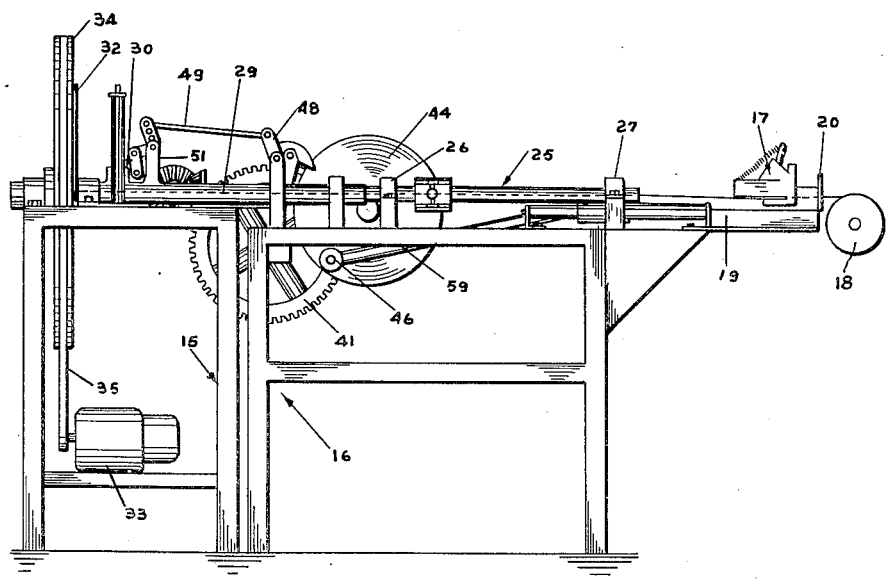
Figure 2 is a front view of Figure 1.
Figure 3:
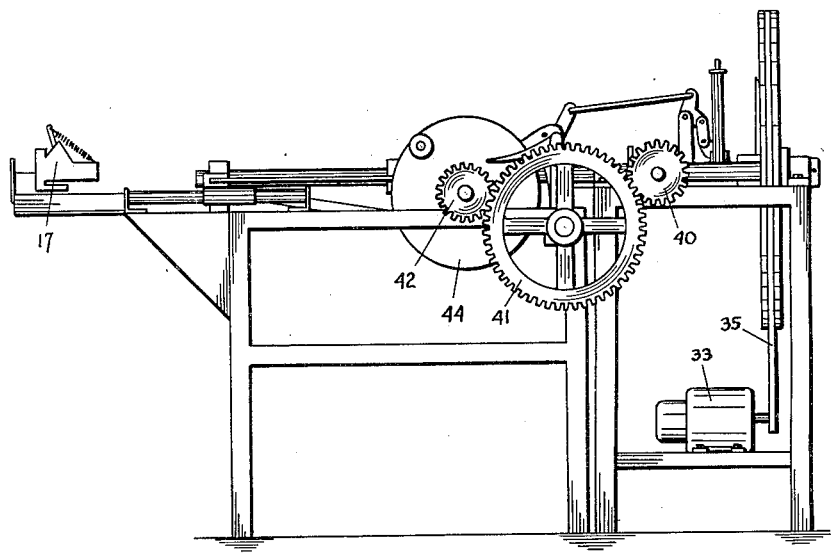
Figure 3 is a rear view of the cutting machine.
Figures 4, 5:
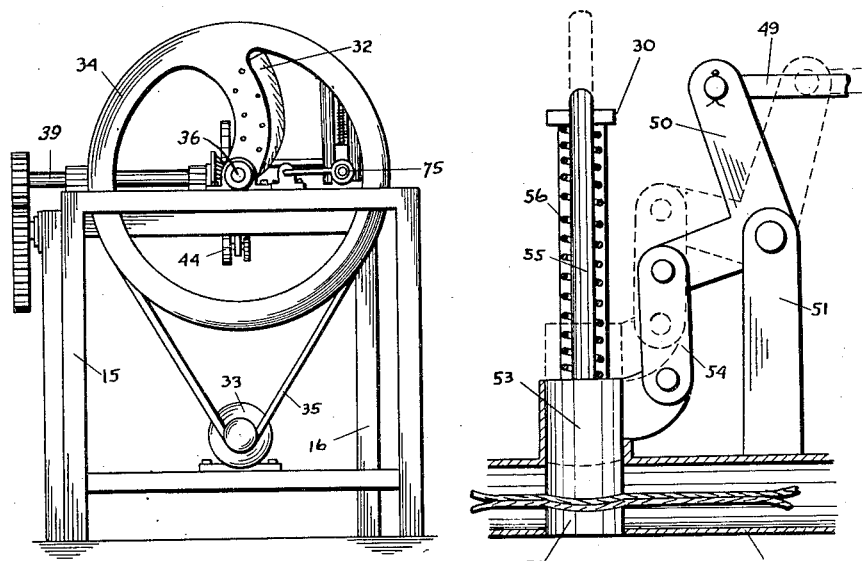
Figure 4 is an end view of the cutting machine.
Figure 5 is an enlarged sectional detail of the twine holder.

In the invention hereinafter described, the cutting machine is adapted to have a plurality of spools of twisted cord suitably supported with respect to the same so that the cord on these spools are concentrated into one lead and fed into the machine.

Referring to the drawings, the twine cutting machine consists of the frames 15 and 16 which are placed together to substantially mount the mechanism therefor. The leader 17 is suitably mounted on one end of the machine and is adapted to lead the strands from the spool 18 to the machine. The leader 17 evens the tension of the strands so that no overlapping will occur or no single strand slip and cause short ends.

The leader 17 is suitably mounted on the projecting member 19, which extends outward from the frame 16. The plate 20 on the end of this member 19 has a hole therein, through which the twine passes. The twine is guided through the aperture 21 in the projecting member 19 and the arm member 22 exerts a downward pressure on the twine. The arm member 22 is pivotally mounted on the projecting member 19 and held in position by means of the tension spring 23. In this respect, the arm member 22 assures correct tension in the twine as it extends between the leader 17 and the feeder 24.

The feeder 24 is suitably supported on the frame 16 and the reciprocating tube 25 of the same is slidably supported in the brackets 26 and 27. The movable grabber 28 is incorporated into the tube 25 and adapted to grip the strands on its forward stroke and release the same on the backward stroke.

The movable grabber 28 is adapted to feed the twine forward through the guide tube 29, where it passes through the stationary grabber 30. This grabber 30 is operated from the rotating disc 44 of the machine in co-operation with a suitable mechanism for releasing same on each cut of the blade 32.

The motor 33 is located on a support in the lower part of the frame 15 and is adapted to drive the blade 32. In this respect, the blade is mounted on the V pulley 34, which is connected to the motor 33 by means of the belt 35.

The V pulley 34 is suitably mounted on the shaft 36 which, in turn, has the bevel gear 37 fixedly secured thereon. The bevel gear 37 engages the bevel gear 38, which is fixed on the shaft 39 and adapted to drive the gears 40, 41 and 42. The gear 42 is mounted on the shaft 43 and the latter, in co-operation with the rotating or tripper disc 44, forms a crankshaft. This tripper disc has the rollers 45 and 46 on each side thereof and at opposite edges of the same. As the tripper plate rotates, the roller 45 engages the arm 47, thus turning the lever 48 which, in turn, actuates the pull rod 49. The free end of the pull rod 49 is connected to the rocker arm 50, which is pivotally mounted on the bracket 51. The stationary grabber 30 consists of the stationary jaw 52 and the movable jaw 53 between which the twine passes as it moves through the tube 29. The movable jaw 53 is connected to the rocker arm 50 by the link 54. The movable jaw 53 is fixedly secured to the upright rod 55. The compression spring 56 is supported on the movable jaw 53 about the upright rod 55 and exerts a downward pressure on the former, thus gripping the twine between the same and the stationary jaw 52. As the pull rod 49 is actuated by the lever 48, the movable jaw 53 is raised, permitting the twine to pass between the same and the stationary jaw 52. The catch 57 engages the cutout 58 in the shaft 48—A, on which the lever 48 is mounted, as the latter is turned upward to indirectly raise the movable jaw 53, thus holding the same substantially in a raised position. As the tripper disc 44 rotates another half turn, the roller 46 engages the catch 57 so as to release the lever 48, thus permitting the movable jaw 53 to be closed with respect to the stationary jaw 52 by means of the compression spring 56.

The crank rod 59 is pivotally conected to the tripper disc 44 and to the crosshead 60. The guide members 61 and 62 are suitably mounted on the frame 16 and are adapted to slidably support the crosshead 60. The reciprocating tube 25 is slidably supported in the brackets 26 and 27. The movable grabber 28 is fixedly secured on the reciprocating tube 25 and adapted to move therewith.

The reciprocating tube 25 consists of the tube sections 66 and 67 which are adapted to be secured within the housing 65 of the movable grabber 28. The upper and lower jaws 68 and 69 are slidably fitted in the housing 65 and adapted to move horizontally, thus opening and closing with respect to one another. In this respect, the links 70 and 71 are pivotally mounted on the outer surface of the housing 65. The ends of the links 70 and 71 are pivotally connected to the front and rear movable jaws 68 and 69, and to the arm 72. The connecting rod 73 forms a connection between the crosshead 60 and the arm 72. The pivotal connections between the various components connecting the crosshead 60 and the links 70 and 71 actuate the latter immediately upon movement of the crosshead 60 in either direction, thus closing or opening the jaws 68 and 69 with respect to one another. In this instance, as the crosshead 60 and feeder 24 move forward, the jaws 68 and 69 are closed, thus feeding the twine forward towards the knife or blade 32, and as the same moves backward these jaws are open, thus permitting the twine to remain in its forward position. The twine passes from the feeder 24 through the guide tube 29 to the cutting blade 32, and the length of the strands after cutting are determined by the travel of this feeder.

The safety rod 74 is operated by the crosshead 60 and extends forward therefrom to a suitable point at the end of the guide tube 29. A loop or eye 75 is provided on the end of the safety rod 74, which is adapted to guide the twine from the guide tube 29 out past the cutting blade 32, thus assuring perfect safety for the operator as the cutting blade comes down.

In the operation of the invention, the cutting blade 32, the tripper disc 44, and the crosshead 60 are all operated directly or indirectly by the motor 33. The strands of twisted cord or twine pass from the spools into the leader 17. From this point the twine passes into the reciprocating tube 25. During the forward movement of the feeder or reciprocating tube 25, the movable grabber 28 incorporated in the same is in a closed position, thus moving the twine forward. The twine is fed through the guide tube 29 and passes the jaws of the stationary grabber 30 which is in an open position. The stationary grabber 30 is then closed by the action of the tripper disc 44 and its components. The twine extending out past the stationary grabber 30 is guided by the safety rod 74 as the cutting blade comes down to shear the same. The crosshead 60 moves backward and the end of the twine is substantially held by the stationary grabber 30 as the feeder or movable grabber 28, which is in an open position, also moves backward. During this operation, the leader 17 maintains an even tension in the strands of twine. As the feeder or movable grabber 28 starts its second forward movement, the jaws of same are closed, thus moving the cord forward, and the operation as hereinbefore described is repeated.

It will be seen from the foregoing that a machine has been provided which will automatically cut cord, twine and the like into equal lengths with a single operator attending same, thus effecting a substantial saving in labor costs.

What I claim is:

1. In a twine cutting machine, a frame, a motor supported on said frame, a pulley suitably connected to said motor, a cutting blade mounted on said pulley, a rotating disc geared to the shaft of said pulley, a crosshead, a crank rod connecting said rotating disc and said crosshead, a pair of rollers on each side of said rotating disc at opposite edges thereof, an arm pivotally mounted with respect to said frame, a lever fixedly secured with respect to said arm, a pull rod pivotally connected to said lever, a stationary grabber suitably connected to said pull rod, one of said rollers being adapted to engage said arm, thus opening said stationary grabber, a catch adapted to retain said arm in position thus maintaining said stationary grabber in an open position, and the second of said rollers being adapted to engage said catch for releasing said arm thus permitting said stationary grabber to close, a feeder suitably connected to said crosshead and adapted to be actuated by the latter, a movable grabber incorporated in said feeder, said movable grabber being closed during the forward movement of said feeder, and said movable grabber being open during the backward movement of said feeder.

2. In a twine cutting machine, a frame, a motor supported on said frame, a pulley suitably connected to said motor, a cutting blade mounted on said pulley, a rotating disc geared to the shaft of said pulley, a crosshead, a crank rod connecting said rotating disc and said crosshead, a pair of rollers on each side of said rotating disc at opposite edges thereof, an arm pivotally mounted with respect to said frame, a lever fixedly secured with respect to said arm, a pull rod pivotally connected to said lever, a stationary grabber suitably connected to said pull rod, one of said rollers being adapted to engage said arm, thus opening said stationary grabber, a catch adapted to retain said arm in position thus maintaining said stationary grabber in an open position, and the second of said rollers being adapted to engage said catch for releasing said arm, thus permitting said stationary grabber to close, a feeder comprising a housing, tube sections fixedly secured in each end of said housing, a pair of movable jaws slidably accommodated in said housing, links pivotally connected to said movable jaws and said housing, an arm pivotally connected to said crosshead and said links and adapted to open and close said movable jaws as said feeder is moved in either direction.

OTTO PIETSCH.

REFERENCES CITED

The following references are of record in the file of this patent:

UNITED STATES PATENTS

| Number | Name | Date |
| --- | --- | --- |
| 2,051,491 | Lockett | Aug. 18, 1936 |
| 2,136,831 | Vuilleumier | Nov. 15, 1938 |
| 2,211,862 | Rosenthal | Aug. 20, 1940 |
| 2,214,478 | Rosenthal | Sept. 10, 1940 |
| 2,319,099 | Abramson | May 11, 1943 |
| 2,333,158 | Dowd | Nov. 2, 1943 |
| 2,359,140 | Meitner | Sept. 26, 1944 |